Patented Dec. 12, 1950

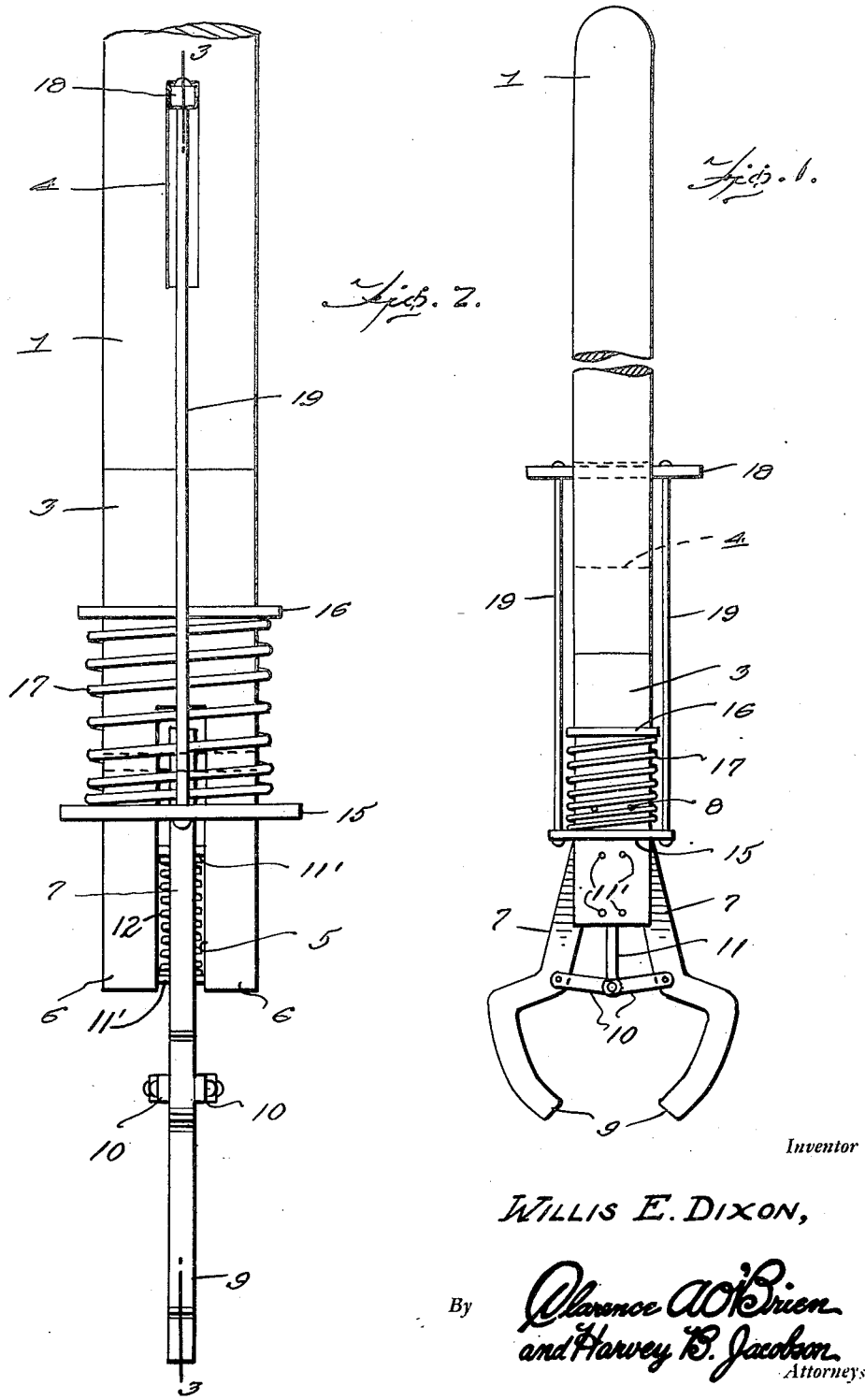

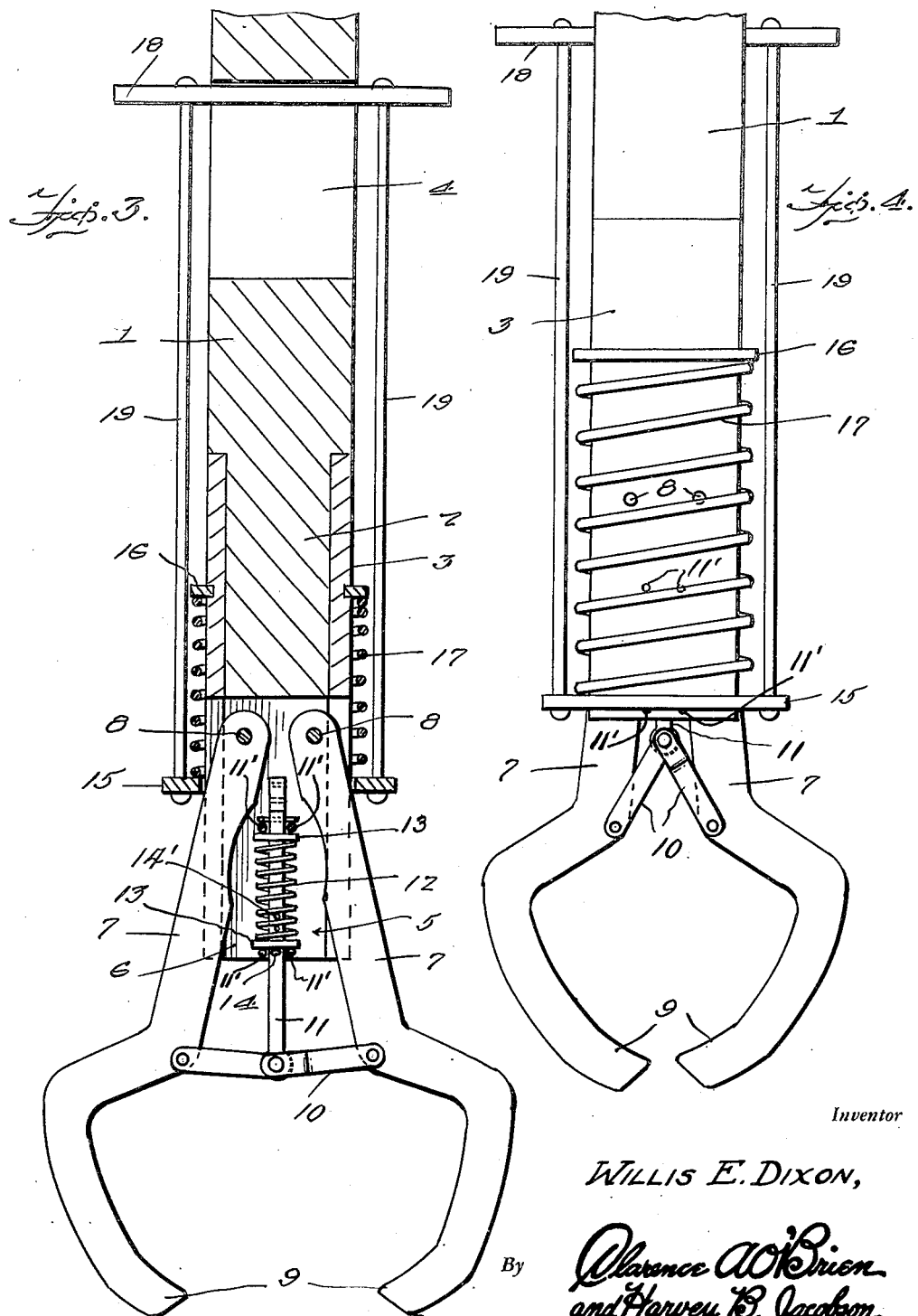

2,533,230

UNITED STATES PATENT OFFICE 2,533,230

ANIMAL CATCHER AND HOLDER

Willis E. Dixon, Stronghurst, Ill.

Application August 18, 1944, Serial No. 549,999½

2 Claims. (Cl. 119—154)

The present invention relates to new and useful improvements in animal catchers and holders, particularly for swine, and has for one of its important objects to provide, in a device of this character comprising a pair of opposed, coacting jaws for receiving the snout of the hog therebetween, a novel construction and arrangement for automatically closing said jaws when the implement is contacted with the animal and slight pressure applied thereto.

Another very important object of the invention is to provide an implement of the aforementioned character wherein the jaws will be caused to maintain a firm grip on the snout of the animal without effort or attention on the part of the operator.

Still another very important object of the invention is to provide an animal catcher and holder of the character described wherein the jaws may be readily opened for releasing the animal, and, further, when the jaws are so opened, the implement will be reset for the next operation.

Other objects of the invention are to provide an animal catching and holding device which will be comparatively simple in construction, strong, durable, highly efficient and reliable in use, compact, light in weight and which may be manufactured at low cost.

All of the foregoing, and still further objects and advantages of the invention, will become apparent from a study of the following specification, taken in connection with the accompanying drawings, wherein like characters of reference designate corresponding parts throughout the several views, and wherein:

Figure 1 is a view in side elevation of an animal catcher and holder constructed in accordance with the present invention.

Figure 2 is an elevational view of the lower portion of the device, taken at right angles to Figure 1.

Figure 3 is a vertical sectional view, taken substantially on the line 3—3 of Figure 2, showing the jaws open.

Figure 4 is a view in side elevation of the lower end portion of the device, showing the jaws closed.

Referring now to the drawings in detail, it will be seen that reference character 1 designates an elongated handle of wood or other suitable material, which handle may be of any desired length and diameter. In the embodiment of the invention which has been illustrated, the handle 1 includes a reduced forward end portion 2 having secured thereon a metallic sleeve 3. Adjacent the sleeve 3, the handle 1 has formed therein a longitudinal slot 4 the purpose of which will be presently set forth. Extending longitudinally into the handle 1 from the lower end thereof is a kerf 5 providing bifurcations 6.

Arms 7 have one end portion pivotally secured, as at 8, between the bifurcations 6 for swinging movement in the kerf 5. Formed integrally with the free ends of the arms 7 are opposed, coacting jaws 9 for receiving and gripping the snout of a hog therebetween.

The arms 7 are connected by a toggle 10. A plunger 11 is pivotally connected at one end to the toggle 10. The plunger 11 extends slidably into the kerf 5 and is operable between pairs of guide pins 11' which extend between the bifurcations 6. A coil spring 12 is operatively connected to the plunger 11 for actuating the toggle 10 past dead center and for opening the jaws 9. The ends of the coil spring 12 are engaged with washers 13 on the plunger 11. The lower washer 13 abuts a pin 14 which is selectively insertable in longitudinally spaced apertures 14' in the plunger 11 for regulating the extent of movement of the toggle 10 past dead center.

A ring 15 is slidable on the sleeve 3 and operable on the arms 7. Fixed on the sleeve 3 at an intermediate point is a collar 16. A coil spring 17 encircles the sleeve 3 and has one end engaged with the collar 16 and its other end engaged with the slip ring 15 for swinging the arms 7 inwardly in a manner to close the jaws 9 when the toggle 10 is broken.

A bar 18 is operable in the slot 4 and has its end portions projecting therefrom. Rods 19 connect the bar 18 to the ring 15 for retracting said ring against the tension of the coil spring 17.

It is thought that the operation of the device will be readily apparent from a consideration of the foregoing. Briefly, for setting the jaws 9, the ring 15 is retracted against the tension of the spring 17, thereby permitting the relatively weak spring 12 to move the plunger 11 downwardly in a manner to open the toggle 10 for opening the jaws 9. When thus actuated, the toggle 10 is moved past said center for retaining the jaws 9 in open position. This is shown to advantage in Figure 3 of the drawings. To catch a hog, the operator manipulates the implement to cause the open jaws 9 to straddle the snout of the animal and to cause the toggle 10 to contact said snout. It is now only necessary to exert sufficient pressure against the snout of the animal to break the toggle 10 upwardly against the tension of the spring 12. When the toggle 10 is thus broken, the relatively strong coil spring 17 moves the slip ring 15 downwardly on the arms 7 for closing the jaws 9 against the tension of the spring 12. In this manner a firm grip is maintained on the snout of the animal without effort or attention on the part of the operator. To release the animal and reset the device, the operator pulls upwardly on the bar 18 for again retracting the slip ring 15 against the tension of the spring 17. The spring 12 then functions for again opening the jaws 9 through the medium of the plunger 11 and the toggle 10. The device is now ready for the next operation.

It is believed that the many advantages of an animal catcher and holder constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. An animal catcher and holder comprising an elongated handle having a bifurcated end to provide a bearing slot and formed with a longitudinal slot spaced from said bearing slot and extending in the same plane therewith, a pair of coacting jaws having shank portions terminally and pivotally mounted upon said handle within said bearing slot, interconnected toggle links pivotally and terminally connected to and between intermediate portions of said jaws, horizontally and vertically spaced guide pins disposed transversely of said bearing slot, a jaw operating plunger pivotally connected with the interconnected ends of said toggle links slidably disposed within said bearing slot between said guide pins, a coil spring within said bearing slot and disposed about said plunger having one end of the spring fixed relative to the handle and the other end of the spring operatively connected to said plunger, a slip ring disposed about said shank portions of said jaws being slidable on said handle, a manually operated bar mounted transversely through said longitudinal slot for longitudinal movement, parallel connecting rods between said bar and slip ring, a reinforcing sleeve about said handle adjacent the bight end of said bearing slot, a radially extending collar fixed to and about said sleeve, and a relatively heavy jaw closing coil spring disposed about said handle between said collar and slip ring.

2. An animal catcher and holder comprising an elongated handle having a bifurcated end to provide a bearing slot and formed with a longitudinal slot spaced from said bearing slot and extending in the same plane therewith, a pair of coacting jaws having shank portions terminally and pivotally mounted upon said handle within said bearing slot, interconnected toggle links pivotally and terminally connected to and between intermediate portions of said jaws, horizontally and vertically spaced guide pins disposed transversely of said bearing slot, a jaw opening plunger pivotally connected with the interconnected ends of said toggle links slidably disposed within said bearing slot between said guide pins, a coil spring within said bearing slot and disposed about said plunger having one end of the spring fixed relative to the handle and the other end of the spring operatively connected to said plunger, means for variably regulating and adjusting the tension of said spring upon said plunger, a slip ring disposed about said shank portions of said jaws being slidable on said handle, a manually operated bar mounted transversely through said longitudinal slot for longitudinal movement, parallel connecting rods between said bar and slip ring, a reinforcing sleeve about said handle adjacent the bight end of said bearing slot, a radially extending collar fixed to and about said sleeve, and a relatively heavy jaw closing coil spring disposed about said handle between said collar and said slip ring.

WILLIS E. DIXON.

REFERENCES CITED

The following references are of record in the file of this patent:

UNITED STATES PATENTS

| Number | Name | Date |
|---|---|---|
| 80,350 | Hoffman | July 28, 1868 |
| 714,170 | Generaux | Nov. 25, 1902 |
| 1,018,065 | Marble | Feb. 20, 1912 |
| 1,039,737 | Hester | Oct. 1, 1912 |
| 1,463,175 | Rasmussen | July 31, 1923 |
| 1,706,332 | Theriot | Mar. 19, 1929 |
| 1,810,753 | Brown | June 16, 1931 |

FOREIGN PATENTS

| Number | Country | Date |
|---|---|---|
| 266 | Great Britain | Jan. 22, 1879 |